(12) United States Patent
Trouilhet et al.

(10) Patent No.: US 8,617,677 B2
(45) Date of Patent: Dec. 31, 2013

(54) MULTILAYER FILMS FOR RECLOSABLE PACKAGING

(75) Inventors: Yves M Trouilhet, Vesenaz (CH); Jacques Roulin, Vesenaz (CH)

(73) Assignee: E I Du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/553,881

(22) Filed: Jul. 20, 2012

(65) Prior Publication Data

US 2013/0029553 A1 Jan. 31, 2013

Related U.S. Application Data

(60) Provisional application No. 61/512,013, filed on Jul. 27, 2011.

(51) Int. Cl.
*B29D 22/00* (2006.01)

(52) U.S. Cl.
USPC ............. 428/35.7; 428/36.91; 428/41.7

(58) Field of Classification Search
USPC .................... 428/35.7, 36.91, 41.7
See application file for complete search history.

(56) References Cited

U.S. PATENT DOCUMENTS

| | | | |
|---|---|---|---|
| 4,673,601 A | 6/1987 | Lamping | |
| 5,089,320 A | 2/1992 | Straus | |
| 6,258,423 B1 | 7/2001 | Giori | |
| 6,302,290 B1 | 10/2001 | Engelaere | |
| 6,358,577 B1 * | 3/2002 | Bowen et al. | 428/35.3 |
| 6,511,723 B1 | 1/2003 | Engelaere | |
| 6,777,050 B1 | 8/2004 | Engelaere | |
| 7,422,782 B2 * | 9/2008 | Haedt et al. | 428/41.7 |
| 7,622,176 B2 | 11/2009 | Bardiot | |
| 7,799,399 B2 * | 9/2010 | Sargeant et al. | 428/35.9 |
| 8,323,759 B2 * | 12/2012 | Chicarella et al. | 428/35.7 |
| 8,399,080 B2 * | 3/2013 | Chicarella et al. | 428/35.7 |
| 2004/0077759 A1 | 4/2004 | Bardiot | |
| 2013/0029553 A1 * | 1/2013 | Trouilhet et al. | 442/327 |

FOREIGN PATENT DOCUMENTS

EP 0160975 A3 11/1985
GB 2319746 A 6/1998

* cited by examiner

*Primary Examiner* — N. Edwards

(57) ABSTRACT

Disclosed is a multilayer structure that comprises a heat sealable layer comprising amorphous polyethylene terephthalate with a melting point greater than 200° C., a pressure sensitive adhesive and at least one tie layer encapsulating the pressure sensitive adhesive. The structure can be coextruded without degrading the pressure sensitive adhesive. Also disclosed is a reclosable package comprising the structure and methods to make such structures.

11 Claims, 2 Drawing Sheets

MULTILAYER FILMS FOR RECLOSABLE PACKAGING

This application claims priority to U.S. provisional application 61/512013, filed Jul. 27, 2011; the entire disclosure of which is herein incorporated by reference.

This invention relates to multilayer films comprising hot-coextrudable pressure-sensitive adhesives, which are suitable for use in packages that may be opened and reclosed easily and to methods of coextruding a thermoplastic composition with a low melt processing temperature with a different thermoplastic composition having a significantly higher melt processing temperature.

BACKGROUND OF THE INVENTION

Flexible packaging materials comprising layers of thermoplastic polymers are used to package a variety of products, including food. For example, cereals, potato chips, and other snack foods are packaged in such materials. The packages are formed in packaging machines in which the material is sealed to itself by heated sealing jaws. However, when a package is opened by pulling apart one of the heat seals, normally at the top of the package, the heat seal is not resealable without the application of heat as well as pressure.

This may be a problem for the consumer who does not wish to use the entire contents of the package at one time. After having opened the container in order to remove part of the contents, the consumer may want to be able to reseal the container easily and effectively. For example, in the case of foodstuffs, the consumer may want to be able to reseal the package containing the unconsumed foodstuff in order to maintain its freshness or palatability. Thus, there is a need for a sealing structure for containers which allows easy opening and effective and simple resealing of the container after part of its contents has been removed.

Resealable or reclosable packages have been developed to meet this need. In this type of package, the adhesive plays an essential role insofar as, once the package has been opened by the end user, the quality of the reclosure and of the reopening will depend on the performance of the adhesive. Pressure sensitive adhesives remain tacky at ambient temperatures and can be adhered to substrates or structure layers simply by manual pressure. This property means that the PSA will stick to many surfaces unless it is masked during processing to make and fill a package.

Reclosable packages may incorporate a multilayer film in which a pressure-sensitive adhesive (PSA) is positioned between a layer of a heat-sealable material and a substrate or structure layer.

To prepare a reclosable package, a portion of the heat-sealable layer of the film is contacted to a container or to another portion of the heat sealable layer and heat-sealed to it. When the package is first opened, the sealant material is torn in the area of the heat seal, thereby exposing the PSA. The package is reclosable by the application of pressure alone to the PSA, which adheres to the package in the former heat-seal area.

For example, EP0160975 discloses a hot- or cold-sealable multilayer sheet for reclosable packages. U.S. Pat. No. 5,089,320 relates to a multilayer film for reclosable packaging obtained by coextrusion or coextrusion coating.

GB2319746 discloses two films, one serving as a container after thermoforming, the other serving as a lid intended to be heat-sealed around the outline of the first film, and containing a layer of PSA-type adhesive consisting of an elastomer and a tackifying resin. The sealing layer for the two films can be an ionomer, for example available under the tradename SUR-LYN® from E. I. du Pont de Nemours & Company, Wilmington, Del. (DuPont).

U.S. Pat. Nos. 6,302,290, 6,511,723, and 6,777,050 disclose films and packages suitable for reclosable packages. Some of the films are obtained by blown film coextrusion with the PSA as the inside layer of the bubble and an outer layer that is suitable as a heat-sealable layer, followed by collapsing the bubble to encapsulate the PSA between two layers of the heat-sealable material. This process necessarily limits the film to symmetrical structures or requires additional steps to laminate the symmetrical structure to other layers to provide a suitable packaging film. A film comprising the structure polyolefin/PSA/polyolefin prepared by a collapsing bubble technique may be adhesively laminated to biaxially oriented polyethylene terephthalate (boPET) or biaxially oriented polypropylene (boPP).

Previous films for reclosable packages have been limited to those in which the sealant layer comprises polyolefins (e.g., low density polyethylene (LDPE) or high density polyethylene (HDPE) or metallocene polyethylene (mPE; PE produced by metallocene catalysis)), or ionomers. These materials have been used because they can be coextruded easily with the PSA because of their melt processing temperature and because they are the most commonly used seal layers in packaging.

However, use of polyolefins has drawbacks, including limited adhesion to other packaging materials such as polyethylene terephthalate (PET). They may also exhibit stringing on first opening the package because of their high elongation at break. Stringing is the formation of long filaments of the sealant layer that are pulled from the seal interface as the film is peeled away.

Amorphous polyethylene terephthalate (APET) as a heat seal layer has good adhesion to PET. However, coextrusion of a PSA in contact with APET is very challenging because the minimum melt processing temperature of APET is above 250° C. (a typical APET melts at around 225° C.) and the maximum melt processing temperature of the PSA to avoid degradation is 180° C.

Reclosable lids for sealing to PET have been produced by first coating the PSA on boPET, then applying an overcoating to avoid blocking in the roll. In a second step the structure is coextrusion-coated with tie/APET but the tie resin has high elongation at break. Also, the cost of these films is high because of the two steps necessary to prepare the film.

U.S. Pat. No. 7,422,782 claims a multilayer film suitable for use in packaging applications comprising at least a polymeric first layer having a first surface and an opposing second surface wherein the polymeric first layer comprises a heat-sealable, water-insoluble aliphatic polyester; a polymeric second layer having a first surface and an opposing second surface and comprising a pressure-sensitive adhesive, wherein the second surface of the polymeric second layer is in contact with the first surface of the polymeric first layer and forms a peelable/resealable bond therebetween; and a third layer in contact with the first surface of the polymeric second layer. Because aliphatic polyester such as polylactic acid (PLA) has a melting temperature below 180° C., it can be coextruded at melt temperatures of less than 200° C., just above the maximum melt processing temperature of PSA.

U.S. Pat. No. 7,622,176 discloses a hot-extrudable PSA suited for reclosable packages and multilayer films in which the hot-extrudable PSA is positioned between a separable and sealable layer and a complexable layer. In the films, the sealable layer and the complexable layer are limited to materials not including polyester. The three-layer film may be laminated to a nonsealable film to give the final package mechanical properties, barrier properties, printing properties, etc.

Accordingly, there exists a need for films useful in reclosable packages with improved properties such as reduced elongation at break and/or better adhesion to packaging materials such as PET. Desirably, they are prepared by coextrusion processes that involve only a single step.

SUMMARY OF THE INVENTION

This invention provides a multilayer structure comprising, consisting essentially of, or consisting of, (a) a heat sealable layer, (b) a PSA layer, (c) a tie layer, (d) a structure layer, and optionally (e) an additional tie layer wherein the heat sealable layer comprises or consists essentially of APET having a melting temperature above 200° C.;

the PSA layer can comprise or consist essentially of a pressure sensitive adhesive positioned between (a) and (c);

the tie layer can comprise or consist essentially of a polymer composition having a melting temperature of about 80 to about 120° C. wherein one face of (c) is in direct contact with (b) and the other face of (c) is in direct contact with (d);

the structure layer can comprise or consist essentially of an ethylene homopolymer, ethylene α-olefin copolymer, propylene homopolymer, propylene α-olefin copolymer, PET, metallized PET, oriented polypropylene, oriented polyamide, polyvinyl chloride, CPA, polyacrylonitrile, paper, foil, non-woven fabric, or combinations thereof; and wherein at least one of the compositions of (a) or (d) has a melting point significantly higher than the degradation temperature of the pressure sensitive adhesive; and the additional tie layer can comprise or consist essentially of a polymer composition having a melting temperature of about 80 to about 120° C. wherein one face of (e) is in direct contact with (a) and the other face of (e) is in direct contact with (b).

In the multilayer structure above, the PSA layer can be characterized by cohesive failure when the multilayer structure is subjected to a peel force of less than or equal to 11 N/cm.

The invention also provides a blown film method for preparing a multilayer structure disclosed above, which comprises or consists essentially of:

(1) melting, in separate extruders, (a) a first composition comprising or consisting essentially of APET having a melting temperature above 200° C., (b) a composition comprising or consisting essentially of a PSA, (c) a tie layer composition comprising or consisting essentially of a polymer composition having a melting temperature of about 80 to about 120° C., and (d) a composition comprising or consisting essentially of an ethylene homopolymer, ethylene α-olefin copolymer, propylene homopolymer or propylene α-olefin copolymer, and optionally (e) an additional tie layer composition comprising or consisting essentially of a polymer composition having a melting temperature of about 80 to about 120° C., to provide molten streams of (a), (b), (c), (d) and (e), when present, wherein at least one of the compositions of (a) or (d) has a melting point significantly higher than the degradation temperature of the PSA;

(2) passing the molten streams of (a), (b), (c), (d) and (e), when present, through a set of annular dies to provide a multilayer tubular bubble wherein a layer of (b) is positioned between a layer of (a) and a layer of (c), the layer of (a) is an outer layer, the layer of (d) is the inner layer of the multilayer bubble and the optional layer (e) when present is positioned between (a) and (b);

(3) expanding the bubble in the radial direction by inflating with a fluid and drawing the bubble in the axial direction; and (4) cooling the bubble to provide a multilayer tubular film.

The invention also provides a cast film method for preparing a multilayer structure disclosed above, which comprises or consists essentially of:

(1) melting, in separate extruders, (a) a first composition comprising or consisting essentially of APET having a melting temperature above 200° C., (b) a composition comprising or consisting essentially of a PSA, (c) a tie layer composition comprising or consisting essentially of a polymer composition having a melting temperature of about 80 to about 120° C., and (d) a composition comprising or consisting essentially of an ethylene homopolymer, ethylene α-olefin copolymer, propylene homopolymer or propylene α-olefin copolymer, and optionally (e) an additional tie layer composition comprising or consisting essentially of a polymer composition having a melting temperature of about 80 to about 120° C., to provide molten streams of (a), (b), (c), (d) and (e), when present, wherein at least one of the compositions of (a) or (d) has a melting point significantly higher than the degradation temperature of the PSA;

(2) passing the molten streams of (a), (b), (c), (d) and (e), when present, through a slot die to provide a multilayer molten stream wherein a layer of (b) is positioned between a layer of (a) and a layer of (c), the layer of (a) is a first surface layer and the layer of (d) is a second surface layer of the multilayer molten stream and the optional layer (e) when present is positioned between (a) and (b);

(3) optionally laying the multilayer molten stream that exits the die in close contact with a casting roll having an air-knife or a vacuum box;

(4) cooling the multilayer molten stream to provide a multilayer cast film.

The invention also provides a coextrusion coating method for preparing a multilayer structure disclosed above, which comprises or consists essentially of:

(1) melting, in separate extruders, (a) a first composition comprising or consisting essentially of APET having a melting temperature above 200° C., (b) a composition comprising or consisting essentially of a PSA, (c) a tie layer composition comprising a polymer composition having a melting temperature of about 80 to about 120° C., and optionally (e) an additional tie layer composition comprising or consisting essentially of a polymer composition having a melting temperature of about 80 to about 120° C., to provide molten streams of (a), (b), (c), and (e) when present wherein at least one of the compositions of (a) or (c) has a melting point significantly higher than the degradation temperature of the PSA (2) combining the molten streams of (a), (b), (c) and (e) when present into a multilayer stream wherein a layer of (b) is positioned between a layer of (a) and a layer of (c) and the optional layer (e) when present is positioned between layer (a) and layer (b);

(3) passing the multilayer stream through a slot die to provide a multilayer melt curtain;

(4) contacting the melt curtain with a substrate or structure layer (d) comprising or consisting essentially of PET, metallized PET, oriented polypropylene, oriented polyamide, polyvinyl chloride, polyacrylonitrile, paper, foil, non-woven fabric, or combinations thereof, so that the layer of (c) contacts the substrate or structure layer to provide a molten multilayer coating on the substrate or structure layer; and (5) cooling the molten multilayer coating to solidify the coating and provide a coated multilayer structure.

This invention also provides a package comprising the multilayer structure disclosed above.

DETAILED DESCRIPTION OF THE INVENTION

Figure 1:
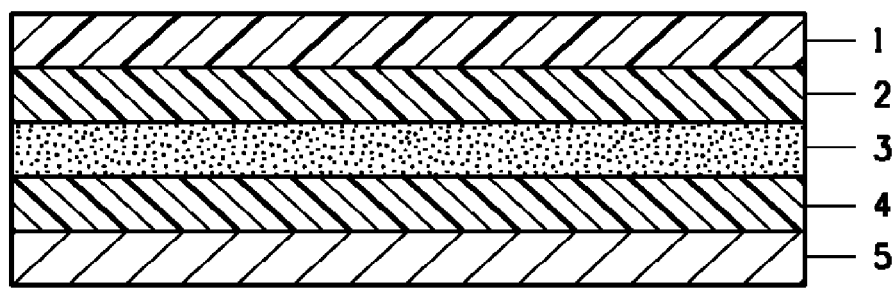
FIG. 1 illustrates a multilayer structure comprising a pressure sensitive adhesive layer.

All publications, patent applications, patents, and other references mentioned herein are incorporated by reference in their entirety.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such and "about" may encompass a range of +/−1 to 5% of an expressed number or value. The term "significantly higher" means that there is at least 10% or even 20% difference between two numbers or values.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A 'consisting essentially of' claim occupies a middle ground between closed claims that are written in a 'consisting of' format and fully open claims that are drafted in a 'comprising' format.

When a component is defined as an "optional" component, it may or may not be present in the composition, structure, or process in which the optional component is described. Optional additives or components, as defined herein, at a level that is appropriate for such additives, and minor impurities are not excluded from a composition by the term "consisting essentially of" unless expressly stated as being excluded.

Unless stated otherwise, all percentages, parts, ratios, and like amounts, are defined by weight.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

Unless stated otherwise, all percentages, parts, ratios, and like amounts, are defined by weight.

A semi-aromatic polyester homopolymers or copolymers can be produced by combining monomers dibasic acids such as, for instance, terephthalic acid, isophthalic acid, or adipic acid with glycols such as, for instance, ethylene glycol, cyclohexanedimethanol, diethylene glycol, propanediol, butanediol, or neopenthyl glycol. Amorphous polyester terephthalate (APET) is a semi-aromatic polyester homopolymer or copolymer. It can have a density at room temperature (about 20-25° C.) of less than 1300 Kg/m$^3$.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 18 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

In the field of adhesives, different types of failure in peel may be distinguished when peeling one layer from another under stress at various angles of peel and speeds. Interfacial adhesive failure occurs at the adhesive/substrate interface, wherein the adhesive layer peels cleanly away from the substrate layer. Cohesive failure occurs within the actual layer of adhesive. When peeling a multilayer film under stress and speed, the adhesive layer itself splits within itself and transfers a portion of the sealant material to each of the substrates that are in contact with the adhesive layer. Internal strength of the adhesive material is the determining factor for actual strength of the adhesion. For pressure sensitive adhesives, cohesive-type failure considerably improves the "reclosability" property of the package. However, this intrinsic property of the adhesive is in general inconsistent with the viscosity and hot cohesion properties required for coextrusion. A pressure sensitive hot-melt composition as described in U.S. Pat. No. 7,622,176 is able to reconcile these two opposing properties.

The term "substrate" is exchangeable to "structure layer"

However, coextrusion of the PSA/APET is very challenging because the minimum melt processing temperature of APET is at least 250° C. and the maximum melt processing temperature of the PSA to avoid degradation is about 180° C. A die hot enough to allow a molten layer of APET to pass through will result in thermal degradation of the PSA composition.

Surprisingly, it was discovered that positioning a molten PSA layer between two other molten layers during coextrusion through a die prevents degradation of the PSA composition even if at least one of the other layers has a melt temperature significantly higher than the degradation temperature of the PSA. Without being bound by any theory, it appears that the surrounding layers insulate the PSA layer from the hot die and/or other polymer compositions having melt temperatures significantly higher than the PSA. They also serve to contain the components of the PSA composition within an inner layer, minimizing decomposition. The resulting multilayer flow allows for reduction in residence time at elevated temperature of the PSA in the die. This technique allows production of multilayer films containing an APET sealant layer, a PSA inner layer and a structure layer.

Depending on the processing and thermal history, PET homopolymers and copolymers may exist either as amorphous (transparent) or semi-crystalline polymers. An APET copolyester useful in the heat-sealant layer can derive from copolymerization of at least the following components: from about 10 to about 60 mole % terephthalic acid ("Monomer A"); from about 10 to about 60 mole % ethylene glycol ("Monomer B"); and from about 5 to about 60 mole % of a third monomer being a secondary di-acid ("Monomer C") and/or a secondary diol ("Monomer D"). Examples of Monomer C include succinic acid, adipic acid, azelaic acid, sebacic acid, 1,10-decanedicarboxylic acid, phthalic acid, isophthalic acid, dodecanedioic acid, and the like. Preferred Monomers C are azelaic, sebacic, and/or isophthalic acid. Examples of Monomer D include propylene glycol, methoxypolyalkylene glycol, neopentyl glycol, trimethylene glycol, tetramethylene glycol, hexamethylene glycol, diethylene glycol, and the like. APET suitable for heat sealing are available from DuPont as SELAR® PT or under the APPEEL® trademark. A particularly useful APET is APPEEL® 93D894 because of its low elongation at break (<20%) and therefore no filaments when breaking the seal layer for opening the first time, sealability to PET at low temperature (e.g., 110° C.), and low total migration in oil at 40° C. and as long as 10 days when coextruded with PSA (2 mg/sqdm whereas upper limit is 10 mg/sqdm).

A composition useful in the PSA layer has been disclosed in U.S. Pat. No. 7,622,176. It comprises a blend of 45 to 85 weight % of at least one styrene block copolymer formed from at least one styrene monomer and at least one other comonomer, such as ethylene, propylene, isoprene, butadiene and butylene, and 15 to 55 weight % of at least one compatible tackifying resin.

The styrene block copolymer may possess a structure that is linear, radial or star-shaped, diblock, triblock or multiblock, the intermediate block consisting of at least one of the abovementioned comonomers. The styrene block copolymer may comprise about 10 and 35%, preferably from about 10 to about 25 weight % of a styrene phase in the polymer and greater than 30%, preferably greater than 40 weight % of diblocks in the polymer. The styrene block copolymer has a melt flow index (MFI) according to condition No. 10 of the NFT 51-016 standard of between 2 and 40 g/10 min.

The tackifying resin may be a resin or a blend of resins conventionally used in hot-melt adhesives will be used, such as rosin or its derivatives, especially rosin esters, optionally hydrogenated ones; polyterpenes, terpene phenolics or derivatives thereof; and optionally hydrogenated polymers coming from aliphatic or aromatic cuts or blends of these cuts; having a softening point measured according to the EN 1238 standard of from 5 to 150° C., preferably from 80 to 140° C. To give the hot-melt adhesive tack suitable for the pressure-sensitive application, the predominant resin is chosen with a pronounced aliphatic character, to obtain sufficient compatibility between the resin and the non-styrenic elastomeric phase of the block copolymer.

The pressure sensitive adhesive composition is hot extrudable and has at the temperature of use of the package (generally between −20 and +40° C.) an elastic modulus $G'<5\times10^5$ Pa (Dahlquist criterion). It may have a viscosity, at a temperature of at least 130° C., lying within a range located above the power curve defined by $\eta=22\,000\times(d\gamma/dt+200)^{-0.82}$ wherein $d\gamma/dt$ comprises a shear rate between 100 and 1,000 $s^{-1}$. It also may have a tensile strength at a pull rate of 1 $ms^{-1}$ lying within the range located below the polynomial curve defined by $$Y=-2.82\times10^{-16}X^6+5.92\times10^{-13}X^5-4.97\times10^{-10}X^4+2.15\times10^{-7}X^3-4.99\times10^{-5}X^2+6.26\times10^{-3}X+4.71\times10^{-2}$$

wherein Y comprises an ordinate representing the stress expressed in MPa and X comprises an abscissa representing the deformation expressed in %.

The PSA composition can have an adjusted cold cohesion such that the hot-extrudable pressure sensitive adhesive is capable of exhibiting predominately cohesive failure during the first opening of the package.

The PSA may also contain a small fraction of plasticizer, stabilizer and/or filler, these being additives conventionally used in hot-melt adhesives.

Suitable extrudable PSA includes a PSA comprising a block copolymer of styrene and elastomer having a density of 0.96 g/cc, with the designation M3156, and a PSA with the designation M550, both commercially available from Bostik Findley Inc., Wauwatosa, Wis.

Depending on the composition of the other layers in the multilayer structure, if a cohesive failure is obtained in the hot-melt pressure sensitive adhesive layer upon opening the package for the first time, the maximum propagation force at the first opening of the package will generally be less than or equal to 11 N/cm (which characterizes easy-open packages). If an adhesive failure is obtained, the opening force will then automatically be less than the cohesion force of the hot-melt adhesive. This type of failure will also be characteristic of an easy-open package, but runs the risk of having adhesion properties on reclosure that are inferior to the requirements of the use. For suitable reclosability, the forces for the next five reopening operations will have values of greater than around 2 N/cm and preferably greater than or equal to 4 N/cm.

Tie layer compositions useful in the structures described herein have melting points from about 80 to about 120° C. Such melting temperatures allow the tie layer composition to be coextruded in contact with the PSA composition without significant degradation of the PSA.

The composition for the tie layer (c) desirably has excellent adhesion to the PSA layer (b) and the layer (d) so that cohesive failure of the PSA layer is favored. Similarly, the composition for the optional tie layer (e) when present in a multilayer structure desirably has excellent adhesion to the APET layer (a) and the PSA layer (b) so that cohesive failure of the PSA layer is favored on opening the package for the first time.

Of note are multilayer structures, packages and processes to prepare them in which the layer (a) and the layer (b) are in direct contact with each other; that is, there is no optional layer (e) positioned between (a) and (b).

The compositions of the tie layers (c) and (e) may be the same or different, depending on the other layers envisioned in the multilayer structure. Compositions for the tie layers may be selected from polyethylene homopolymers or copolymers, polypropylene homopolymers and copolymers, copolymers of ethylene and polar comonomers, polyolefin graft copolymers, and blends thereof Polyethylene copolymers can include copolymers of ethylene with α-olefins wherein units derived from ethylene comprise the major portion or percentage by weight of the copolymer. By "major portion or percentage" is meant about 70 weight %, about 80 weight % or more of the copolymer. Examples of polyethylene copolymers are copolymers of ethylene and alpha-olefins, including copolymers with propylene and other alpha-olefins, wherein copolymerized units of ethylene comprise the major portion of the copolymer.

Polyethylene homopolymers and polyethylene copolymers can include linear polyethylenes such as HDPE, linear low density polyethylene (LLDPE), very low or ultralow density polyethylenes (VLDPE or ULDPE), branched polyethylenes such as low density polyethylene (LDPE), and copolymers of ethylene and α-olefin monomers prepared in the presence of metallocene catalysts, single site catalysts or constrained geometry catalysts (metallocene polyethylenes, or MPE). The densities of PE suitable for use in the composition can range from about 0.865 g/cc to about 0.970 g/cc.

Polyethylenes may be prepared by a variety of methods such the well-known Ziegler-Natta catalyst polymerization process (e.g., U.S. Pat. No. 4,076,698 and U.S. Pat. No. 3,645,992), metallocene catalyzed polymerization, VERSIPOL® single-site catalyst polymerization and free radical polymerization. Such methods are well known to one skilled in the art. The description of such methods is omitted for the interest of brevity.

Examples of linear polyethylenes include ethylene copolymers having copolymerized units of α-olefin comonomers, which may have 3 to 20 carbon atoms. These comonomers may be present as copolymerized units in an amount of up to about 20 or 30 weight % of the copolymer. Preferred alpha-olefins include propylene, 1-butene, 1-hexene, 4-methyl-1-pentene, 1-octene, 1-decene, 1-tetradecene and 1-octadecene. Copolymers may be obtained by polymerization of ethylene with two or more alpha-olefins, preferably including propylene, 1-butene, 1-octene and 4-methyl-1-pentene. Also contemplated for use as a polyethylene component are blends of two or more of these ethylene alpha-olefin copolymers as well as mixtures of an ethylene homopolymer and one of the suitable ethylene alpha-olefin copolymers.

The tie layer compositions may include ethylene copolymers obtained from copolymerization of ethylene with at least one polar monomer such as vinyl acetate, alkyl acrylates, alkyl methacrylates, glycidyl esters, acrylic acid, methacrylic acid, dicarboxylic comonomers, and carbon monoxide. Copolymerized units derived from ethylene may comprise, based on the copolymer weight, from about 20, 40 or 50% to about 70, 80, 90 or 95% of the copolymer.

The ethylene copolymers may comprise or consist essentially of copolymerizing units (monomers) of (a) ethylene and at least one comonomer selected from (b) vinyl acetate; (c) olefins of the formula $CH_2=C(R^1)CO_2R^2$, where $R^1$ is hydrogen or an alkyl group with 1 to 8 carbon atoms and $R^2$ is an alkyl group with 1 to 8 carbon atoms, such as methyl, ethyl, or butyl, and/or (d) olefins of the formula $CH_2=C(R^3)CO_2R^4$ where $R^3$ is hydrogen or an alkyl group with 1 to 6 carbon atoms, such as methyl, and $R^4$ is glycidyl; and optionally (e) carbon monoxide; or combinations thereof. More than one comonomer may be present as copolymerized units in the ethylene copolymers. That is, the copolymers may be dipolymers, terpolymers or higher order copolymers. Such polymers are commercially available under the ELVAX® or ELVALOY®, both from DuPont.

Ethylene/vinyl acetate copolymers (EVA) include copolymers derived from the copolymerization of ethylene and vinyl acetate or the copolymerization of ethylene, vinyl acetate, and an additional comonomer. Copolymerized units of vinyl acetate may comprise from about 2 to about 45. about 5 to about 30, or about 8 to about 28, weight % of the copolymer. An EVA may have a melt flow rate, measured in accordance with ASTM D-1238, of from 0.1 to 60 g/10 or 0.3 to 30 g/10 minutes. A mixture of two or more different EVAs may be used.

Ethylene/alkyl acrylate or ethylene alkyl methacrylate copolymers include copolymers of ethylene and one or more $C_{1-8}$ alkyl acrylates or methacrylates. Examples include methyl acrylate, ethyl acrylate and butyl acrylate. Examples of the copolymers include ethylene/methyl acrylate copolymer, ethylene/ethyl acrylate copolymer, ethylene/butyl acrylate copolymer, or combinations of two or more thereof. Alkyl acrylate or methacrylate may be incorporated into an ethylene copolymer at 2 to 45, 5 to 45, 10 to 35, or 10 to 28, weight %. Preferred tie layer compositions may comprise ethylene alkyl acrylate copolymers such as ethylene methyl acrylate (EMA) copolymers.

Ethylene/alkyl acrylate or methacrylate copolymers may be prepared by processes well known to one skilled in the art using either autoclave or tubular reactors. See, e.g., U.S. Pat. Nos. 2,897,183, 3,404,134, 5,028,674, 6,500,888, and 6,518,365. Tubular reactor produced ethylene/alkyl acrylate or methacrylate copolymers are commercially available from DuPont as ELVALOY® AC. A mixture of two or more different ethylene/alkyl acrylate or methacrylate copolymers may be used.

Copolymerized units derived from monomer (d) may comprise, based on the copolymer weight, from about 0.5, 2 or 3% to about 17, 20, or 25%. An example of the ethylene copolymer consists essentially of copolymerized units of ethylene and copolymerized units of glycidyl methacrylate and is referred to as EGMA. Additional comonomers may be butyl acrylates or CO. One or more of n-butyl acrylate, tent-butyl acrylate, iso-butyl acrylate, and sec-butyl acrylate may be used. An ethylene copolymer example consists essentially of copolymerized units of ethylene, copolymerized units of butyl acrylate, and copolymerized units of glycidyl methacrylate (EBAGMA) as well as of ethylene, copolymerized units of methacrylate, and copolymerized units of glycidyl methacrylate (EMAGMA). Copolymerized units derived from monomer (d), when present, may comprise, based on the copolymer weight, from about 3, 15 or 20% to about 35, 40 or 70%. The ethylene ester copolymers may be prepared by any suitable process such as those disclosed in U.S. Pat. Nos. 3,350,372, 3,756,996, 5,532,066, 5,543,233. and 5\571878.

The ethylene copolymers may comprise other comonomers such as carbon monoxide in addition to vinyl acetate or olefinic esters such as glycidyl methacrylate or butyl acrylate. When present, copolymerized units of carbon monoxide generally will comprise up to about 20 weight %, or about 3 to about 15 weight % of the total weight of the ethylene copolymer. Copolymers of note include terpolymers comprising copolymerized units of ethylene, butyl acrylate, and carbon monoxide (EBACO) or copolymerized units of ethylene, vinyl acetate, and carbon monoxide (EVACO).

Ethylene acid copolymers useful in a tie layer composition contain copolymerized units of ethylene and copolymerized units of an α,β-unsaturated $C_3$-$C_8$ monocarboxylic acid. The α,β-unsaturated $C_3$-$C_8$ monocarboxylic acid is preferably acrylic acid or methacrylic acid, and the monocarboxylic acid may be present in the copolymer in an amount from about 3 to about 20 weight %, or about 12 to about 20 weight %, or about 4 to about 15 weight % of the copolymer. Of note are ethylene acid dipolymers consisting essentially of copolymerized units of ethylene and copolymerized units of monocarboxylic acid, and ionomers thereof.

The ethylene acid copolymer may also optionally include other comonomers such as alkyl acrylates and alkyl methacrylates wherein the alkyl groups have from 1 to 8 carbon atoms such as methyl acrylate, ethyl acrylate and n-butyl acrylate. These comonomers, when present, can be from 0.1 to about 30% based on the total weight of the copolymer, or about 3 to about 25%. The optional alkyl acrylates and alkyl methacrylates provide softer acid copolymers that after neutralization form softer ionomers.

The acid copolymers may be obtained by high-pressure free radical polymerization, wherein the comonomers are directly copolymerized with ethylene by adding all comonomers simultaneously. This process provides copolymers with "in-chain" copolymerized units derived from the monomers, where the units are incorporated into the polymer backbone or chain. Acid copolymers are commercially available from DuPont under the NUCREL® trademark. These copolymers are distinct from a graft copolymer, in which the acid comonomers are added to an existing polymer chain via a post-polymerization grafting reaction, often by a free radical reaction.

The tie layers may also include ionomers of the ethylene acid copolymers described above. Ionomers are acid copolymers in which a portion of the carboxylic acid groups in the copolymer are neutralized to salts containing metal ions such as alkali metal, transition metal, or alkaline earth metal cations, including lithium, sodium, potassium, magnesium, calcium, or zinc, or a combination of such cations. Neutralization of an ethylene acid copolymer can be effected by first making the ethylene acid copolymer and treating the copolymer with basic compound(s) comprising metal cations. The copolymer may be neutralized so that from about 10 to about 90% of the available carboxylic acid groups in the copolymer are neutralized to salts containing metal ions. For example, from about 10 to about 70 or about 35 to about 70% of the available carboxylic acid groups may be ionized by treatment with a basic compound (neutralization) with at least one metal ion selected from sodium, zinc, or lithium. U.S. Pat. No. 3,264,272 discloses such ionomers, which are commercially available from DuPont under the Surlyn® tradename. Ionomers may be preferred compositions for layer (c) when layer (d) comprises foil or metallized PET.

Compositions suitable for the tie layer include ethylene dicarboxylic random copolymers comprising copolymerized units of ethylene and copolymerized units of a dicarboxylic comonomer selected from the group consisting of cyclic anhydrides of $C_4$-$C_8$ unsaturated acids, monoesters of $C_4$-$C_8$ unsaturated acids having at least two carboxylic acid groups, diesters of $C_4$-$C_8$ unsaturated acids having at least two carboxylic acid groups, and mixtures thereof, wherein the ethylene dicarboxylic copolymer comprises from about 0.3 to about 20 weight % copolymerized units of the dicarboxylic comonomer, based on the weight of the random copolymer.

Examples of suitable dicarboxylic comonomers include unsaturated anhydrides such as maleic anhydride and itaconic anhydride; $C_1$-$C_{20}$ alkyl monoesters of 1,4-butenedioc acids (e.g. maleic acid, fumaric acid, itaconic acid and citraconic acid), including methyl hydrogen maleate, ethyl hydrogen maleate, propyl hydrogen fumarate, and 2-ethylhexyl hydrogen fumarate; and diesters of 1,4-butenedioc acids, including dimethyl maleate, diethyl maleate and dipropyl fumarate. Of these, maleic anhydride, ethyl hydrogen maleate and methyl hydrogen maleate are preferred. Maleic anhydride and ethyl hydrogen maleate are most preferred.

The ethylene dicarboxylic random copolymer may comprise about 0.3 to about 20 weight % copolymerized units of the dicarboxylate comonomer, based on the weight of the ethylene dicarboxylate random copolymer. Alternatively, copolymerized units of the dicarboxylate comonomer comprise about 4 to about 20 weight %, or about 5 to about 15 weight %, or about 6 to about 15 weight %, or about 8 to about 12.5 weight %, of the total weight of the copolymer.

The ethylene dicarboxylate random copolymer may be a dipolymer or a higher order copolymer, such as a terpolymer or tetrapolymer. Copolymers of ethylene copolymerized with maleic acid monoester are preferred. Specific examples include ethylene/maleic acid monoester dipolymers (such as ethylene/ethyl hydrogen maleate dipolymer), ethylene/maleic acid monoester/methyl acrylate terpolymers, ethylene/maleic acid monoester/methyl methacrylate terpolymers, ethylene/maleic acid monoester/ethyl acrylate terpolymers, ethylene/maleic acid monoester/ethyl methacrylate terpolymers, ethylene/maleic acid monoester/n-butyl acrylate terpolymers and ethylene/maleic acid monoester/n-butyl methacrylate terpolymers.

A representative ethylene dicarboxylate random copolymer is a random copolymer having a melt index of about 0.3 to 100 grams/10 minutes measured using ASTM D-1238 at 190° C., using a 2160 gram weight, and consisting essentially of copolymerized ethylene and a monoalkyl ester of a 1,4-butenedioic acid in which the alkyl group of the ester has 1 to 6 carbon atoms. Preferably, the copolymer is a dipolymer of ethylene and about 4 to about 15 weight % of ethyl hydrogen maleate (an EMAME copolymer). A specific polymer may comprise from about 8 to about 10 weight % of ethyl hydrogen maleate. Such copolymers are commercially available from DuPont under the tradename Fusabond®.

Terpolymers or tetrapolymers comprise comonomers in addition to the ethylene and dicarboxylate comonomer. Suitable additional comonomers may be selected from the group consisting of vinyl acetate, alkyl acrylates, such as methyl acrylate and butyl acrylate, and alkyl methacrylates, for example methyl methacrylate and n-butyl methacrylate. Preferably, when the ethylene dicarboxylate random copolymer is a higher order polymer such as a terpolymer, the combined comonomers other than ethylene are present in about 6 to about 30 weight % of the copolymer.

Ethylene/maleic anhydride/alkyl ester terpolymers are commercially available from Arkema under the tradename LOTADER®, with maleic anhydride amounts of 0.3 to about 4 weight % and acrylic ester content of about 5 to 30 weight %, based on the total weight of the copolymer.

Ethylene/ethyl hydrogen maleate/alkyl ester terpolymers are also known. They include terpolymers with ethyl hydrogen maleate content of 0.5 to about 10 weight % and acrylic ester content of about 5 to 30 weight %, based on the total weight of the copolymer.

The ethylene dicarboxylate random copolymers may be synthesized as described in U.S. Pat. No. 4,351,931. Some examples of this type of ethylene/ester copolymer are described in US 20050187315.

The tie layer may also include graft copolymers comprising a trunk polymer comprising polyethylene, polypropylene, styrene-ethylene-butene-styrene triblock copolymer, polybutadiene, ethylene propylene diene or a copolymer copolymerized units of ethylene and copolymerized units of vinyl acetate, alkyl acrylate or alkyl methacrylate; wherein the alkyl groups have from 1 to 8 carbon atoms, wherein the trunk polymer is modified by grafting thereto cyclic anhydrides of $C_4$-$C_8$ unsaturated acids.

Graft copolymers are synthesized by appending or "grafting" a moiety as a pendant group on an already-formed polymer chain. The grafted comonomer is attached to non-terminal repeat units of an existing polymer chain in a step subsequent to formation of the polymer chain, often by a free radical reaction. In a graft copolymer, none of the atoms of the grafted group are incorporated into the backbone of the polymer chain. The term "trunk polymer" as employed herein includes polyolefins such as polyethylene, ethylene propylene copolymers, and polypropylene or the polymerization product of ethylene and at least one additional polymerizable monomer such as vinyl acetate, alkyl acrylate, alkyl methacrylate, etc. that are polymerized or copolymerized and subsequently grafted with an additional comonomer to provide a graft copolymer.

A preferred anhydride is maleic anhydride. These maleic anhydride-grafted polymers (maleated polymers) are polymeric materials in which maleic anhydride is reacted with an existing polymer, often under free-radical conditions, to form anhydride groups appended to the polymer chain. They include maleated polyethylene, maleated polypropylene, maleated ethylene vinyl acetate copolymers, maleated ethylene methyl acrylate copolymers, maleated metallocene polyethylene, maleated ethylene propylene copolymers, maleated styrene-ethylene-butene-styrene triblock copolymer, and maleated polybutadiene and maleated ethylene propylene diene copolymers.

The trunk polymers may be synthesized and subsequently grafted with maleic anhydride according to well-known procedures. Such graft copolymers are also commercially available from DuPont under the tradename Fusabond®.

The structure layer (d) may comprise or consist essentially of ethylene homopolymer, ethylene α-olefin copolymer, propylene homopolymer or propylene α-olefin copolymer, polyethylene terephthalate, metallized polyethylene terephthalate, polyamide, polyvinyl chloride, paper, foil, or mixtures thereof; and wherein at least one of the compositions of (a) or (d) has a melting point significantly higher than the degradation temperature of the pressure sensitive adhesive.

The compositions of any of the layers in the multilayer structure may additionally comprise 0.0001 to about 10% by weight of the layer conventional additives used in the polymer art including plasticizers, compatibilizers or coupling agents, flexomers, stabilizers including viscosity stabilizers and hydrolytic stabilizers, antioxidants, ultraviolet ray absorbers, anti-static agents, dyes, pigments or other coloring agents, inorganic fillers, fire-retardants, lubricants, reinforcing agents such as glass fiber and flakes, processing aids, anti-block agents, release agents, and/or mixtures thereof. Optional additives, when used, may be present in various quantities so long as they are not used in an amount that detracts from the basic and novel characteristics of the composition, including good adhesion to the other layers of the multilayer structure, easy opening of the package and reclosability.

In some embodiments, the multilayer films can be prepared by blown film techniques. The method comprises (1) melting, in separate extruders, (a) a first composition comprising amorphous polyethylene terephthalate having a melting temperature above 200° C., (b) a composition comprising a pressure sensitive adhesive, (c) a tie layer composition comprising a polymer composition having a melting temperature of about 80 to about 120° C., and (d) a composition comprising an ethylene homopolymer, ethylene α-olefin copolymer, propylene homopolymer or propylene α-olefin copolymer, and optionally (e) an additional tie layer composition comprising a polymer composition having a melting temperature of about 80 to about 120° C., to provide molten streams of (a), (b), (c), (d) and (e) when present wherein at least one of the compositions of (a) or (d) has a melting point significantly higher than the degradation temperature of the pressure sensitive adhesive; (2) passing the molten streams of (a), (b), (c), (d) and (e) when present through a set of annular dies to provide a multilayer tubular bubble wherein a layer of (b) is positioned between a layer of (a) and a layer of (c), the layer of (a) is the outer layer and the layer of (d) is the inner layer of the multilayer bubble and the optional layer (e) when present is positioned between (a) and (b); (3) expanding the bubble in the radial direction by inflating with a fluid and drawing the bubble in the axial direction; and (4) cooling the bubble to provide a multilayer tubular film.

Examples of such blown film structures include tubular films comprising, from sealant layer to structure layer (inside to outside) structure such as ("/" denotes between layers)

APET/PSA/EMA/LDPE;
APET/PSA/EMA/HDPE;
APET/PSA/EVA/LDPE;
APET/PSA/EVA/HDPE;
APET/PSA/LDPE;
APET/PSA/HDPE;
APET/EMA/PSA/EMA/LDPE;
APET/EMA/PSA/EMA/HDPE;

The tubular films may be used in their tubular form to prepare pouches by cutting to a desired length and heat sealing the open ends together with products inside. Alternatively, the tubular film may be further processed by slitting the tube and forming a generally planar film that also may be further laminated to a structural layer eventually printed and processed into various packaging forms, including lidding films.

Cast films may be prepared by a method comprising or consisting essentially of: (1) melting, in separate extruders, (a) a first composition comprising or consisting essentially of amorphous polyethylene terephthalate having a melting temperature above 200° C., (b) a composition comprising or consisting essentially of a pressure sensitive adhesive, (c) a tie layer composition comprising or consisting essentially of a polymer composition having a melting temperature of about 80 to about 120° C., and (d) a composition comprising or consisting essentially of an ethylene homopolymer, ethylene α-olefin copolymer, propylene homopolymer or propylene α-olefin copolymer, and optionally (e) an additional tie layer composition comprising or consisting essentially of a polymer composition having a melting temperature of about 80 to about 120° C., to provide molten streams of (a), (b), (c), (d) and (e) when present wherein at least one of the compositions of (a) or (d) has a melting point significantly higher than the degradation temperature of the pressure sensitive adhesive; (2) passing the molten streams of (a), (b), (c), (d) and (e) when present through a slot die to provide a multilayer molten stream wherein a layer of (b) is positioned between a layer of (a) and a layer of (c), the layer of (a) is a first surface layer and the layer of (d) is a second surface layer of the multilayer molten stream and the optional layer (e) when present is positioned between (a) and (b); and (4) cooling the multilayer molten stream to provide a multilayer cast film.

The method provides a generally planar film that can be used in various packaging forms.

APET/PSA/EMA/LDPE;
APET/PSA/EMA/HDPE;
APET/PSA/EVA/LDPE;

APET/PSA/EVA/HDPE;
APET/PSA/LDPE;
APET/PSA/HDPE;
APET/EMA/PSA/EMA/LDPE;
APET/EMA/PSA/EMA/HDPE;

The cast film may be further laminated to a structural layer eventually printed and processed into various packaging forms, including lidding films.

Other multilayer structures may be prepared using extrusion coating techniques. The method comprises (1) melting, in separate extruders, (a) a first composition comprising amorphous polyethylene terephthalate having a melting temperature above 200° C., (b) a first tie layer composition comprising a polymer composition having a melting temperature of about 80 to about 120° C., (c) a pressure sensitive adhesive composition, (d) a second tie layer composition comprising a polymer composition having a melting temperature of about 80 to about 120° C., wherein (a) has a melting point significantly higher than the degradation temperature of the pressure sensitive adhesive; (2) combining the molten streams of (a), (b), (c) and (d) into a multilayer stream wherein a layer of (b) is positioned between a layer of (a) and a layer of (c); (3) passing the multilayer stream through a slot die to provide a multilayer melt curtain; (4) contacting the melt curtain with a substrate so that the layer of (d) contacts the substrate to provide a molten multilayer coating on the substrate; and (5) cooling the molten multilayer coating to solidify the coating and provide a coated multilayer structure.

Substrates for extrusion coating include paper, foil, nonwoven fabrics, PET, metallized PET, oriented polypropylene, oriented polyamide, polyvinyl chloride, polyacrylonitrile, etc. The substrate could be treated prior to the coextrusion coating to improve adhesion of the tie layer (d) to the substrate. Such pretreatment may include corona treatment, flame treatment, plasma treatment, or primer coating.

Example structures prepared by coextrusion coating include the following, wherein the layers are listed from left to right as substrate to sealant layer, where "//" signifies the substrate-coextrudate interface. In the structures listed below, polyester, polypropylene, or polyamide substrates may also be oriented such as biaxially oriented prior to treatment with the co-extrudate. The polyesters and polyolefins can be biaxially oriented.

polyester (MYLAR)//EMA/PSA/APET;
polyester (MYLAR®)//EMA/PSA/EMA/APET;
metallized PET//ionomer/PSA/APET;
metallized PET//ethylene acid copolymer/PSA/APET;
PP//EMA/PSA/APET;
PP//EBA/PSA/APET;
foil//ionomer/PSA/APET;
paper//EMA/PSA/APET
board//EMA/PSA/APET
paper//graft copolymer/PSA/APET; and
polyamide//EMAME-EMA blend/PSA/APET.

Figure 2:
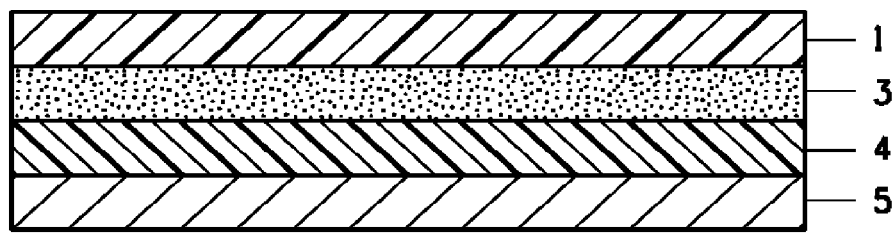
FIG. 2 further illustrates a multilayer structure comprising a pressure sensitive adhesive layer.

The above-disclosed films can be illustrated in FIG. 1 and FIG. 2. FIG. 1 can be a 5 layer structure with layer 1 a heat sealable amorphous polyethylene terephthalate (APET); an optional tie layer 2; a pressure sensitive adhesive (PSA) layer 3; a tie layer 4; and a structure layer 5.

In FIG. 2, the optional tie layer 2 is not present. Layer 1 can be an APET adhered directly to a PSA adhesive layer 3, which is adhered directly to a tie layer 4 and can be an ethylene copolymer such as, for example, ethylene methyl acrylate dipolymer, ethylene ethyl acrylate dipolymer, or an ethyl butyl acrylate dipolymer. The structure layer 5 can be a low density polyethylene, high density polyethylene, a (biaxially oriented) PET, metallized oriented PET (e.g., biaxially oriented), polypropylene (e.g., biaxially oriented), paper, or paper board, Reclosable packages comprise any of the multilayer structures disclosed above, the structure thus possibly being heat-sealed to itself or to a suitable support. The package thus obtained by heat sealing remains completely sealed when being handled. The structure may be peeled manually and easily when the package is opened for the first time, the sealing and separable layer being broken in such a way that the adhesive appears on the surface in the sealing region (of the separation). The package may be reclosed by repositioning the structure in the initial weld (heat-sealed) region by simple manual pressure. Successive reopening and reclosing operations are possible.

Figure 3:
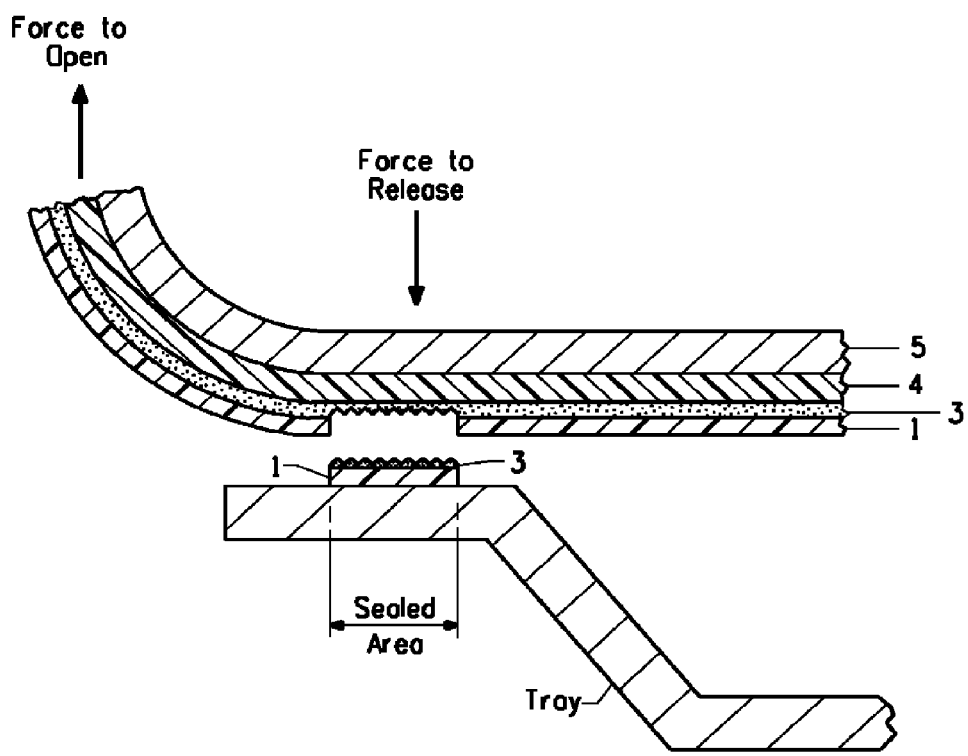
FIG. 3 illustrates a reclosable package.

For example, in FIG. 3, a reclosable package is illustrated in which a 4-layer multilayer film illustrated in FIG. 2 is heat sealed to a support such as a PET tray. To open the sealed package a force is applied in the direction shown on FIG. 3. During opening of the package the APET layer 1 breaks and the sealed area remains on the tray; the PSA layer 3 remains partly on the tray and partly on the film. The multilayer structure can be reclosed onto the support tray by simple press of the structure onto the separated reclosable part (i.e., the seal area) and can easily opened by simply lift the structure.

Notable packages include pouches or bags prepared from the multilayer structure by a combination of folding and heat sealing to provide lockup perimeter seals around the perimeter of the package. For example, the package is a pouch containing a product wherein a portion of the heat sealable layer of the film is sealed to another portion of the heat sealable layer, wherein the seal area between the two portions has a tear strength greater than the cohesive strength of the pressure sensitive layer, so that when the portions of the film are pulled apart at the seal area for the first time, the seal between the two portions remains sealed and the pressure sensitive layer separates cohesively, thereby exposing a portion of the pressure sensitive adhesive layer over an area adjacent to the seal area making it possible to reclose the package by pressing the portion of the pressure sensitive adhesive layer over the seal area.

Another notable package comprises the multilayer structure used as a lidding film with containers including bottles, jars and thermoformed trays, bowls, tubs or the like. For example, a package comprises a container containing a product provided with an opening wherein a portion of the heat sealable layer of the film is sealed as a bead to the edge of the opening and the seal between the film and the edge of the opening has a tear strength greater than the cohesive strength of adhesion between the sealant layer and the pressure sensitive adhesive layer so that, when the film is pulled away from the seal area for the first time exposing the opening, the portion of the sealant layer in the seal area remains sealed to the edge of the container and separates from the rest of the sealant layer and the pressure sensitive layer separates cohesively, thereby exposing a portion of the pressure sensitive adhesive layer over an area adjacent to the seal area making it possible to reclose the package by pressing the portion of the pressure sensitive adhesive layer over the seal area.

A container of note is a thermoformed tray comprising crystalline PET.

EXAMPLES

Materials Used
PETI-1: a polyethylene terephthalate/Isophthalate copolymer, with mp of 225+/−3° C., and Intrinsic Viscosity at 30° C.

of 0.80+/−0.02, available commercially from DuPont under the APPEE®93D894 trademark.

PSA-1: an extrudable pressure sensitive adhesive with the designation M550 commercially available from Bostik Findley Inc., Wauwatosa, Wis.

EMA-1: An ethylene/methyl acrylate dipolymer with 20 weight % methyl acrylate produced under a devolatilization process to reduce the amount of unreacted comonomers in the product, with mp of 93° C., Vicat Softening Point of 51° C., and MI of 5 g/10 min.

EMA-2: An ethylene/methyl acrylate dipolymer with 24 weight % methyl acrylate produced under a devolatilization process to reduce the amount of unreacted comonomers in the product, with mp of 91° C., Vicat Softening Point of 48° C., and MI of 2 g/10 min.

Melting points are determined using differential scanning calorimetry according to ASTM D3418. Vicat softening points were determined according to ASTM 1525. Melt indices (MI) were determined according to ASTM D1238 at 190° C. using a 2.16 kg mass unless otherwise specified.

For example, films can be prepared by coextrusion coating a polyester structure layer with a three-layer coating comprising a tie layer, an inner PSA layer and APET sealant layer such that the tie layer contacts the polyester layer.

PETI-1 was dried at 160° C. during 4 hours and introduced in the hopper of an extruder (2.5", L/D=30) with 5 heating zones set at 240° C., 250° C., 260° C., 260° C., and 260° C. A second extruder (3.5", L/D=30) was fed with PSA-1 with the heated zones set at 120° C., 140° C., 160° C., 160° C. and 160° C. EMA-1 was introduced in a third extruder (2.5", L/D=30) with the 5 heating zones set at 200° C., 220° C., 240° C., 260° C. and 280° C. The feed-bloc and the flat die temperatures were set at 260° C. The substrate Mylar® was 550 mm in width and 23 micron thick was unwind from the main un-winder at a line speed of 100 m/min. The chill-roll was set at 12° C. The melt curtain was overcoating the substrate by 5 mm on each side to avoid sticking The so produced multilayer flexible reclosable structure Mylar®//EMA-1/PSA-1/PETI-1 with layer thickness of 23//5/5/10 micron respectively was winded after trimming about 15 mm on both edges.

Other films such as a film having an outer polyethylene structure layer, an inner PSA layer and APET sealant layer may be prepared by blown film coextrusion.

PETI-1 was dried at 160° C. during 4 hours and introduced in the hopper of an first extruder (50 mm, L/D=24) with 4 heating zones set at 240° C., 270° C., 260° C. and 270° C. PSA-1 was introduced in the hopper of a second extruder (50 mm, L/D=24) with 4 heating zones set at 170° C., 180° C., 180° C. and 180° C. EMA-2 was introduced in the hopper of a third extruder (50 mm, L/D=24) with 4 heating zones set at 160° C., 200° C., 210° C. and 220° C. HDPE FL5580 produced by Borealis was introduced in a fourth and fifth extruder (both 50 mm, L/D=24) with 4 heating zones set at 180° C., 200° C., 210° C. and 220° C. The molten PETI-1 was feeding the upper ring of the annular die set at 260° C. The temperature of the second ring of the annular die fed with PSA-1 was set at 240° C. The molten EMA-2 was feeding the third ring of the annular die set at 230° C. The molten HDPE was feeding the fourth and fifth ring of the annular die set at 220° C. The internal pressure in the bubble was set to obtain a blow-up ratio of 2. The multilayer flexible reclosable structure PETI-1/PSA-1/EMA-2/HDPE with layer thickness of 5/15/5/10/15 micron respectively (total 50 micron) was produced at a line speed of 14 m/min. The so produced film was then adhesive laminated to a reverse printed Mylar® film 12 micron thick.

The invention claimed is:

1. A multilayer structure comprising a heat sealable layer, a pressure-sensitive adhesive layer, a tie layer, a structure layer, and optionally an additional tie layer wherein
the heat sealable layer comprises amorphous polyethylene terephthalate having a melting temperature above 200° C. and is a semi-aromatic polyethylene terephthalate;
the tie layer comprising a polymer composition having a melting temperature of about 80 to about 120° C. wherein one face of the tie layer is in direct contact with the pressure-sensitive adhesive layer and the other face of the tie layer is in direct contact with the structure layer;
the structure layer comprises an ethylene homopolymer, ethylene α-olefin copolymer, propylene homopolymer, propylene α-olefin copolymer, polyethylene terephthalate, metallized polyethylene terephthalate, oriented polypropylene, oriented polyamide, polyvinyl chloride, polyacrylonitrile, paper, foil, non-woven fabric, or combinations thereof; and wherein at least one of the compositions of the heat sealable layer or the structure layer has a melting point significantly higher than the degradation temperature of the pressure sensitive adhesive;
the pressure-sensitive adhesive layer is characterized by cohesive failure when the multilayer structure is subjected to a peel force of less than or equal to about 11 N/cm; and
one face of the additional tie layer, if present, is in direct contact with the heat sealable layer and the other face of layer the additional tie layer is in direct contact with the pressure-sensitive adhesive layer.

2. The multilayer structure of claim 1 wherein the pressure sensitive adhesive comprises a blend of 45 to 85 weight % of at least one styrene block copolymer formed from at least one styrene monomer and at least one other comonomer selected the group consisting of from ethylene, propylene, isoprene, butadiene, and butylene, and 15 to 55 weight % of at least one compatible tackifying resin.

3. The multilayer structure of claim 2 wherein the styrene block copolymer possesses a structure that is linear, radial or star-shaped, diblock, triblock, or multiblock, in which an intermediate block consisting of at least one other comonomer.

4. The multilayer structure of claim 3 wherein the styrene block copolymer comprises from about 10 to about 35% weight % of a styrene phase in the polymer and greater than 30 weight % of diblocks in the polymer.

5. The multilayer structure of claim 4 wherein the compatible tackifying resin comprises a resin or a blend of resins selected from rosin or derivatives thereof, polyterpenes, terpene phenolics or derivatives thereof, or optionally hydrogenated polymers coming from aliphatic or aromatic cuts or blends of these cuts; having a softening point measured according to the EN 1238 standard of from 5 to 150° C., preferably from 80 to 140° C.

6. The multilayer structure of claim 5 wherein the pressure sensitive adhesive composition is extrudable and has an elastic modulus $G'<5\times10^5$ Pa (Dahlquist criterion) at the temperature of between −20 and 40° C.

7. The multilayer structure of claim 6 wherein the tie layer comprises a dipolymer of ethylene and alkyl acrylate.

8. The multilayer structure of claim 1 further comprising the additional tie layer, which comprises a polymer composition having a melting temperature of about 80 to about 120° C.

9. The multilayer structure of claim 2 further comprising the additional tie layer, which comprises a polymer composition having a melting temperature of about 80 to about 120° C.

10. The multilayer structure of claim 2 wherein the additional tie layer comprises an ethylene alkyl acrylate copolymer.

11. The multilayer structure of claim 1 being selected from the group consisting of APET/PSA/EMA/LDPE; APET/PSA/EMA/HDPE; APET/PSA/EVA/LDPE; APET/PSA/EVA/HDPE; APET/EMA/PSA/EMA/LDPE; APET/EMA/PSA/EMA/HDPE; APET/PSA/EMA/biaxially oriented polyester; APET/PSA/ionomer/metallized polyester; APET/PSA/EEA/metallized polyester; APET/PSA/EMA/biaxially oriented polypropylene; APET/PSA/EBA/biaxially oriented polypropylene; APET/PSA/ionomer/foil; APET/PSA/EMA/paper; APET/PSA/EMA/paper board; APET/PSA/EMA/graft copolymer/paper; and APET/PSA/EMA/EMAME/polyamide; wherein APET is amorphous polyethylene terephthalate, PAS is pressure-sensitive adhesive, LDPE is linear low density polyethylene, EMA is ethylene methyl acrylate copolymer, HDPE is high density polyethylene, EVA is ethylene vinyl acetate copolymer, ELEA is ethylene acid copolymer, EBA is ethylene butyl acrylate copolymer, and EMAME is copolymerized ethylene maleic acid monoester copolymer.

* * * * *